United States Patent
Kempf et al.

(10) Patent No.: US 11,651,505 B2
(45) Date of Patent: May 16, 2023

(54) SYSTEMS AND METHOD FOR VISION INSPECTION WITH MULTIPLE TYPES OF LIGHT

(71) Applicant: COGNEX CORPORATION, Natick, MA (US)

(72) Inventors: Torsten Kempf, Aachen (DE); Jens Rütten, Aachen (DE); Michael Haardt, Titz (DE); Laurens Nunnink, Simpelveld (NL)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 17/158,252

(22) Filed: Jan. 26, 2021

(65) Prior Publication Data

US 2021/0233267 A1 Jul. 29, 2021

Related U.S. Application Data

(60) Provisional application No. 62/966,323, filed on Jan. 27, 2020.

(51) Int. Cl.
| | | |
|---|---|---|
| *H04N 13/254* | (2018.01) | |
| *G06T 7/586* | (2017.01) | |
| *H04N 13/218* | (2018.01) | |
| *H04N 13/243* | (2018.01) | |

(52) U.S. Cl.
CPC ............ *G06T 7/586* (2017.01); *H04N 13/218* (2018.05); *H04N 13/243* (2018.05); *H04N 13/254* (2018.05); *G06T 2207/10152* (2013.01)

(58) Field of Classification Search
CPC ..................... H04N 13/243; G06T 2207/10152
USPC ............................................................ 348/48
See application file for complete search history.

(56) References Cited

U.S. PATENT DOCUMENTS

| | | |
|---|---|---|
| 9,494,528 B2 | 11/2016 | Matsuda |
| 9,689,806 B2 | 6/2017 | Matsuda |
| 9,778,203 B2 | 10/2017 | Matsuda |
| 10,036,713 B2 | 7/2018 | Matsuda |
| 10,156,525 B2 | 12/2018 | Matsuda |
| 10,241,056 B2 | 3/2019 | Matsuda |
| 2007/0055406 A1* | 3/2007 | Tropf ................... G06K 9/2036 700/259 |
| 2007/0090280 A1* | 4/2007 | Harding ............. G01B 11/2509 250/225 |

(Continued)

FOREIGN PATENT DOCUMENTS

WO 2012096004 A1 7/2012

OTHER PUBLICATIONS

Woodham, Photometric Method for Determining Surface Orientation from Multiple Images, Optical Engineering, 1980, 19(1):139-144.

(Continued)

*Primary Examiner* — Amir Shahnami
(74) *Attorney, Agent, or Firm* — Quarles & Brady LLP

(57) ABSTRACT

Systems and methods are provided for acquiring images of objects. Light of different types (e.g., different polarization orientations) can be directed onto an object from different respective directions (e.g., from different sides of the object). A single image acquisition can be executed in order to acquire different sub-images corresponding to the different light types. An image of a surface of the object, including representation of surface features of the surface, can be generated based on the sub-images.

17 Claims, 7 Drawing Sheets

(56) References Cited

U.S. PATENT DOCUMENTS

| | | | |
|---|---|---|---|
| 2009/0290039 A1 | 11/2009 | Kanamori et al. | |
| 2013/0070140 A1* | 3/2013 | Gove | H01L 27/14627 |
| | | | 348/302 |
| 2014/0168382 A1* | 6/2014 | Jang | G01B 11/245 |
| | | | 348/47 |
| 2017/0135586 A1* | 5/2017 | Jeon | A61B 5/0205 |
| 2018/0143700 A1* | 5/2018 | Lee | G06F 3/03543 |
| 2019/0373260 A1* | 12/2019 | Kiser | H04N 19/12 |

OTHER PUBLICATIONS

Wu, Radiometry, BRDF and Photometric Stereo, EECS 432—Advanced Computer Vision Notes Series 3, 2003, 10 pages.
European Patent Office, Extended Search Report, Application No. 21153758.4, dated Jun. 15, 2021, 7 pages.

* cited by examiner

SYSTEMS AND METHOD FOR VISION INSPECTION WITH MULTIPLE TYPES OF LIGHT

CROSS-REFERENCE TO RELATED APPLICATIONS

This application claims priority to U.S. provisional patent application No. 62/966,323, titled Systems and Method for Vision Inspection with Multiple Types of Light and filed Jan. 27, 2020, the entirety of which is incorporated herein by reference.

STATEMENT REGARDING FEDERALLY SPONSORED RESEARCH OR DEVELOPMENT

Not applicable.

BACKGROUND OF THE TECHNOLOGY

The present technology relates to imaging systems, including machine vision systems that are configured to acquire and analyze images. Some implementations relate in particular to imaging systems that are configured to acquire images of surface features of objects, including as may be useful to analyze markings or structures provided by the surface features.

Machine vision systems are generally configured for use in capturing images of objects or symbols and analyzing the images to identify the objects or decode the symbols. Accordingly, machine vision systems generally include one or more devices for image acquisition and image processing. In conventional applications, these devices can be used to acquire images, or to analyze acquired images, including for the purpose of evaluating part compliance or decoding barcodes, text, or other symbols in the images. In some contexts, machine vision and other imaging systems can be used to acquire images of objects in order to identify, analyze, or otherwise address features on a surface of an object, including manufactured contours, surface defects, and raised, depressed, or other symbol markings.

BRIEF SUMMARY OF THE TECHNOLOGY

In some applications, it may be useful to acquire images of a target, and in particular of features on a surface of the target (e.g., an object such as a box or manufactured part). Due to lighting considerations and other factors, however, it may sometimes be difficult to acquire images that include appropriate levels of detail of surface features. For example, poor lighting conditions in factory settings can result in images with relatively poor levels of detail relative to the contours of particular structures on a surface of an object. In this regard, certain surface features may not be shown in an image with appropriately high contrast, may not be visible in an image, or may otherwise not be appropriately represented so as to permit completion of a desired analysis of an image.

Some conventional approaches have addressed this problem by acquiring multiple images of an object via multiple image acquisitions (i.e., as executed over different time intervals). Although these approaches can sometimes result in images with appropriate levels of surface detail, they may be limited in some regards. For example, executing multiple image acquisitions for a moving object (e.g., as on a conveyor) can be difficult, both with regard to the increased computational complexity of combining images acquired from different angles and with regard to the possibility that some surface features may still not be appropriately shown, even in a combination of multiple images.

Embodiments of the disclosed technology can address these and other issues to provide for improved acquisition of images of surface features of a target (e.g., a target object). For example, some embodiments provide systems and corresponding methods in which a single image acquisition can be executed using different types of light that are projected onto an imaging target from different directions (e.g., projected simultaneously from different sides of an object). Data from the single image acquisition can then be analyzed with respect to the different types of light in order to generate a single image that shows surface features of the imaging target with a high level of detail. In some embodiments, the different types of light may be light of different polarization orientations (e.g., three or four angularly offset polarization orientations), although other approaches are also possible. In some embodiments, systems may be configured to project two, three, four, or more types of light from a corresponding number of directions, depending on the type of inspection or other analysis desired, in order to generate a detailed surface image from a single image acquisition.

Accordingly, some embodiments of the disclosed technology can be used to quickly and efficiently generate an image of an object, with a very high level of detail regarding surface features of the object. In some cases, due to the innovative use of different types of light as detailed herein, embodiments of the technology can be implemented using relatively inexpensive filters and lighting devices. Further, in many cases, a detailed surface image can be generated with only a single image acquisition. Accordingly, some embodiments can be readily and efficiently applied with regard to moving targets, without substantial (e.g., any) increase in computational load or required equipment relative to implementations for stationary targets.

Some embodiments disclosed herein are primarily presented as systems, such as surface inspection devices, imaging (e.g., machine vision) systems with imaging sensors and lighting arrangements, and so on. Those of skill in the art will recognize that corresponding embodiments (and others) can be executed as methods, such as computer-implemented methods with automated control of image acquisition and, as appropriate, image analysis, according to the capabilities of the associated systems. In this regard, unless otherwise indicated, discussion herein of disclosed systems inherently includes disclosure of corresponding methods that use the disclosed systems to execute the intended functionality.

Similarly, those of skill in the art will recognize that embodiments primarily presented herein as methods can be implemented as systems. For example, various methods disclosed herein can be implemented using a machine vision system with imaging hardware that is configured to implement one or more operations of the relevant method, including through electronic control of lighting arrangements to illuminate a surface with different types of light from different directions and electronic control of imaging devices to execute single image acquisitions that utilize each of the different types of light as reflected from a target at a single point in time.

Consistent with the discussion above, some embodiments of the technology include a method of acquiring images of surface features of a surface of an object. The surface can be simultaneously illuminated with at least three types of light from at least three directions, each of the types of light illuminating the surface from a different one of the at least three directions (e.g., from a different side of the object). A single image acquisition of the illuminated surface can be executed, including acquiring at least three sub-images, each of the at least three sub-images being acquired using a different one of the at least three types of light and at least partly excluding (e.g., at least partly filtering out) the at least two other types of light. An image of the surface, including the surface features, can then be generated for three-dimensional inspection based on the at least three sub-images.

Some embodiments of the technology include an imaging system for acquiring images of surface features of a surface of an object. One or more light sources can be configured to simultaneously illuminate the surface with at least three types of light from at least three directions, each of the at least three types of light being different from the others of the at least three types of light and illuminating the surface from a different one of the at least three directions. One or more imaging sensors can be configured to execute a single image acquisition of the illuminated surface, including acquiring at least three sub-images. Each of the at least three sub-images can be acquired using a different one of the at least three types of light and at least partly excluding the at least two other types of light (e.g., through the use of appropriate light filters). One or more processor devices can be configured to generate an image of the surface, including the surface features, based on the at least three sub-images.

Some embodiments of the technology include another method of acquiring images of surface features of a surface of an object. The surface can be simultaneously illuminated with a first type of light from a first direction and with a second type of light from a second direction, the first and second types of light and the first and second directions being different from each other. A single image acquisition of the illuminated surface can be executed, including: acquiring a first sub-image using the first type of light and at least partly excluding the second type of light and acquiring a second sub-image using the second type of light and at least partly excluding the first type of light. An image of the surface, including the surface features, can be generated based on the first and second sub-images.

Some embodiments of the technology include an imaging system for acquiring images of surface features of a surface of an object. One or more light sources can be configured to simultaneously illuminate the surface with a first type of light from a first direction and with a second type of light from a second direction, with the first and second types of light and the first and second directions being different from each other. One or more imaging sensors can be configured to simultaneously acquire first and second sub-images of the surface, with the first sub-image being acquired using the first type of light and at least partly excluding the second type of light, and with the second sub-image being acquired using the second type of light and at least partly excluding the first type of light. One or more processor devices can be configured to generate an image of the surface, including the surface features, based on the first and second sub-images.

Some embodiments of the technology include a surface inspection device. An imaging device can include one or more imaging sensors that include at least three subsets of pixel detectors. A lighting arrangement can include one or more light sources arranged to illuminate a target area with at least three types of light from at least three directions, with each of the at least three types of light having a different polarization orientation relative to the other at least two types of light and being directed towards the target area from a different one of the at least three directions than the other at least two types of light. A filter arrangement can be arranged to selectively filter each of the at least three types of light relative to a corresponding one of the at least three subsets of pixel detectors. The one or more processing devices can be configured to execute a single acquisition of an object in the target area, including acquiring at least three sub-images corresponding to the at least three subsets of pixel detectors.

Some embodiments of the technology includes an imaging system for analyzing surface features of an object. A lens arrangement can define an optical axis for image acquisition. One or more imaging sensors can be aligned with the lens arrangement and the optical axis. A lighting system can include a first lighting array on a first side of the optical axis, a second lighting array on a second side of the optical axis, and a third lighting array on a third side of the optical axis. One or more processor devices can be configured to analyze the surface features by: controlling the lighting system to simultaneously cause the first lighting array to illuminate the object with a first type of light, cause the second lighting array to illuminate the object with a second type of light, and cause the third lighting array to illuminate the object with a third type of light, each of the first, second, and third types of light being different from the others of the first, second, and third types of light; receiving first sub-image data, second sub-image data, and third sub-image data from the one or more imaging sensors, wherein the first, second, and third sub-image data are acquired by the one or more imaging sensors using a respective one of the first, second, and third types of light, and at least partly excluding one or more of the respective others of the first, second, or third types of light; and collectively analyzing the first, second and third sub-image data to analyze the surface features To the accomplishment of the foregoing and related ends, embodiments of the technology comprise the features hereinafter fully described. The following description and the annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

Figure 1:
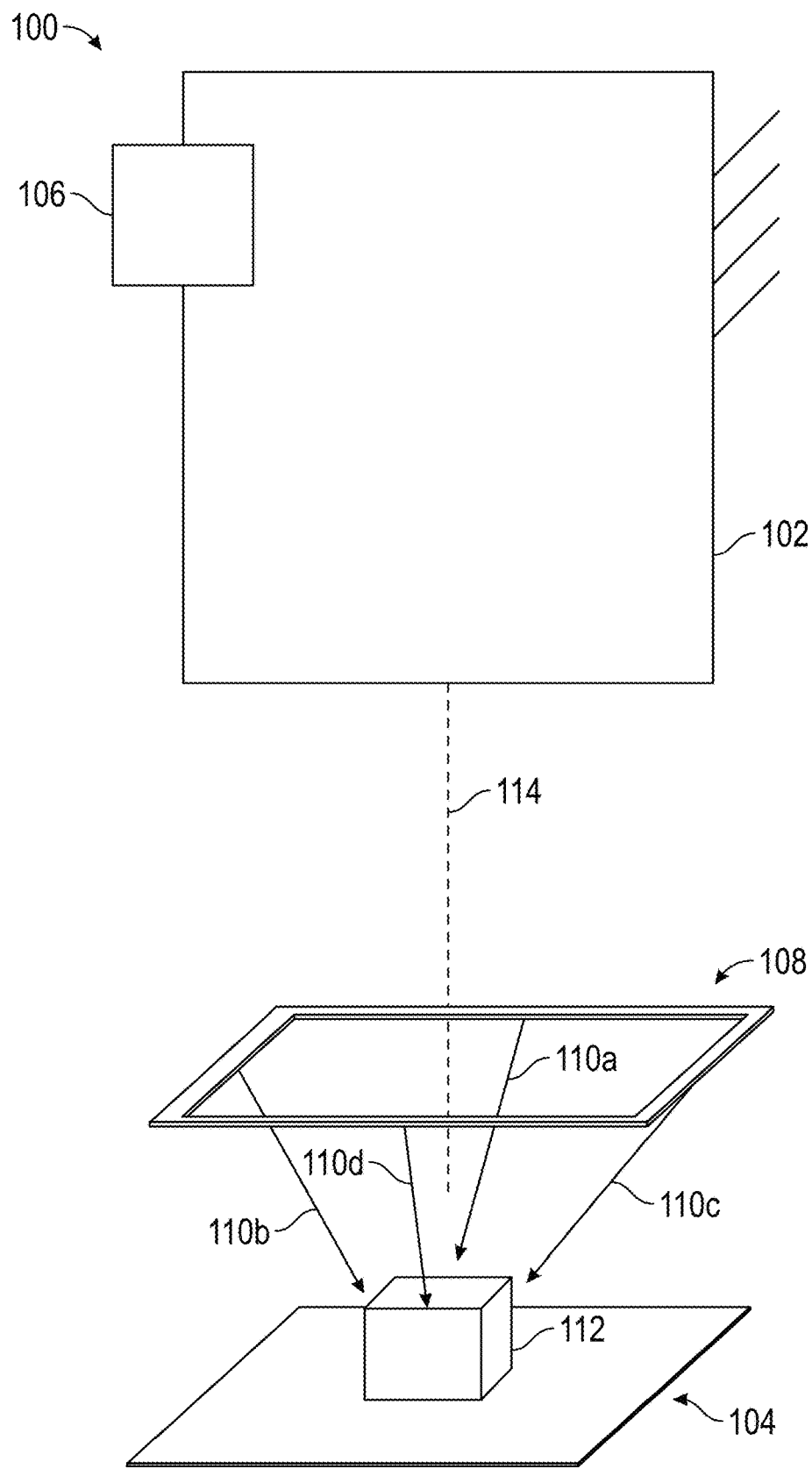
FIG. 1 is a schematic view of an imaging system that includes a lighting arrangement and an imaging device, in accordance with some embodiments of the technology.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE TECHNOLOGY

The various aspects of the subject technology are now described with reference to the annexed drawings, wherein like reference numerals correspond to similar elements throughout the several views. It should be understood, however, that the drawings and detailed description hereafter relating thereto, including illustration in the drawings of a particular order of operations for a particular method, are not intended to limit the claimed subject matter to the particular form disclosed. Rather, the intention is to cover all modifications, equivalents, and alternatives falling within the spirit and scope of the claimed subject matter.

In some embodiments, aspects of the disclosure, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel general purpose or specialized processor chip, a single- or multi-core chip, a microprocessor, a field programmable gate array, any variety of combinations of a control unit, arithmetic logic unit, and processor register, and so on) a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates, etc., and other typical components that are known in the art for implementation of appropriate functionality (e.g., memory, communication systems, power sources, user interfaces and other inputs, etc.).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the disclosure, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

As used herein, unless otherwise specified or limited, a "single image acquisition" refers to image acquisition of a target that is implemented at a single point in time (e.g., over a single time interval that corresponds to a single exposure for an imaging device or group of imaging devices). In some implementations, a single image acquisition can be executed using a single imaging sensor, such that a single image is acquired in a single exposure. In some implementations, a single image acquisition can be executed using multiple imaging sensors, such that each imaging sensor acquires a respective sub-image in a single exposure. With regard to this latter scenario, for example, light from an object may be admitted into an imaging system as part of a single exposure, but may be routed (e.g., using beam splitters) or selectively filtered to impinge on the multiple imaging sensors in different ways.

As used herein, unless otherwise specified or limited, discussion of light of a particular "type" refers to light that exhibits a distinctive characteristic that can be filtered or otherwise separated, using known technology, from light of another type. For example, light that has been polarized with a first polarization orientation (e.g., using a first polarization filter) is of a different type than light that has been polarized with a second, different polarization orientation (e.g., using a second polarization filter). Similarly, light of a first wavelength (e.g., a visible color) is of a different type than light of a second, different wavelength (e.g., near infrared). In some cases, different light sources may be configured to provide light of non-overlapping types (i.e., types that do not share a common defining characteristic). For example, a light source with a first polarization orientation can provide light of a non-overlapping type relative to a light source with a second, different polarization orientation. Similarly, different light sources that provide light within non-overlapping wavelength bands can also provide light of non-overlapping types. In some embodiments, light types may be substantially non-overlapping, i.e., may exhibit relevant characteristics that are 90% distinct in comparison to each other. For example, substantially non-overlapping wavelength bands may overlap over less than 10% of their band width.

As used herein, unless otherwise specified or limited, a "sub-image" refers to an array of pixel data that is acquired during a single image acquisition but does not represent all of the pixel data that is acquired during a single image acquisition. For example, for a single image acquisition, light to illuminate a target can be polarized with different polarization orientations, filtered to pass different colors, or otherwise managed to provide different types of light. After reflecting off the target, particular types of light can then be selectively filtered or passed before impinging on different parts of an imaging sensor (or different imaging sensors) so that different sub-images can be acquired using the different types of light. In some implementations, a single imaging chip may include pixel detectors that have been subdivided into subsets of pixel detectors (e.g., by an integrated or other array of filters), each of which can provide data for a respective sub-image as part of a single image acquisition. In some implementations, a sub-image may include pixel data that spans an entire relevant field of view of a single image acquisition, including when a single image chip is divided into subsets of pixel detectors, each of which acquires a different sub-image.

Generally, as also noted above, embodiments of the disclosure can include systems and methods for acquiring images of objects, including images that can be used for detailed analysis of surface features of an object. In some embodiments, the acquired images can represent three-dimensional surface features with a high degree of contrast and accuracy, such as by accurately representing differences in surface slope of surface features as differences in grey values in the acquired images. Thus, some embodiments can provide improvements over conventional imaging systems and methods, which may require multiple image acquisitions to provide similarly useful images.

In particular, some embodiments include devices that are configured for (or methods that include) illuminating a target object with different types of light from different directions. With a single image acquisition (i.e., at a single time), light can be received into an imaging system so that multiple sub-images of the target object are acquired, with each sub-image being acquired with distinguishable non-overlap between light types. In other words, each sub-image may be acquired using a particular type of light that does not fully or substantially overlap with other types of light used for a single image acquisition, including by at least partly excluding light of one or more particular types to a greater degree than light of one or more other particular types. In some cases, distinguishable non-overlap between light types may indicate that at least 30% of the intensity of light in a particular sub-image is provided at by a particular light type that does not overlap with other light types utilized in illumination for the same single image acquisition. In some cases, distinguishable non-overlap between light types may indicate that a particular sub-image is acquired using primarily (e.g., more than 70%, 80% or 90%) light of a particular type. However, unless otherwise specified or limited, reference in discussion below to implementations that primarily use particular light types should be understood to inherently include alternatives in which, more broadly, distinguishable non-overlapping particular light types are used.

Once acquired with distinguishable non-overlap between light types (e.g., primarily with one light type) the sub-images can then be processed collectively (e.g., using known techniques of image subtraction, combination, photometric stereo analysis, and so on) in order to generate a single image of the target object from the single image acquisition. Due to the use of the associated particular light type and illumination direction to acquire the different sub-images, the sub-images may each represent particular surface features in a particular way. Correspondingly, generating\the single image based on the multiple sub-images can result in the contrast, resolution, and other qualities of representation of surface features of the target object being represented in the generated single image with particularly high contrast, resolution, and general quality (e.g., with differences in slope represented as differences in grey values of the single image).

As used herein, "generating" a single image may be implemented in various ways. In some implementations, pixel data from multiple sub-images can be combined (e.g., the values of the pixels added together) into a separately saved image file or object, such that any given pixel of the separately saved image file or object may represent data from a combination of corresponding pixels of the sub-images. In some implementations, pixel data from multiple sub-images may be considered collectively during image analysis operations without necessarily saving a separate image file or object. For example, during analysis of an imaging event, analysis of any given pixel of a imaged scene can be conducted by considering values of a combination of corresponding pixels of the sub-images. In this regard, a single image may still be considered as having been generated from multiple sub-images for the purpose of image analysis, even though a distinct image file or object may not have been saved, as a whole, separately from the sub-images.

FIG. 1 is a schematic representation of a machine vision system 100 that is configured for image acquisition according to an embodiment of the technology. In the illustrated embodiment, the machine vision system 100 includes an imaging device 102 that is configured to acquire images of a target area 104. Generally, imaging devices as discussed herein, including the imaging device 102, include at least one imaging sensor (e.g., a CCD, CMOS, or other known sensor), at least one lens arrangement that is optically aligned with the at least one imaging sensor, and at least one control device (e.g., a processor device 106) configured to execute computational operations relative to the imaging sensor (e.g., to control illumination, imaging exposure times, or other components or to execute related data processing tasks). In some embodiments, a lens arrangement can include a fixed-focus lens. In some embodiments, a lens arrangement can include an adjustable focus lens, such as a liquid lens or a known type of mechanically adjusted lens.

In some embodiments, an imaging device can be configured as an image processing device, which can be operated to process images that are acquired by an associated (e.g., integrated) imaging sensor and lens arrangement. For example, the imaging device 102 is configured as a computing device for controlling acquisition of images and processing image data that are received from the associated imaging sensor (e.g., to identify and decode symbols). In some embodiments, an imaging device can be configured to communicate image data (e.g., binary pixel values) to a remote processor device (e.g., within a cloud computing or local-network system) for further processing. In this regard, the processor device 106, which can in some cases control any combination of lighting, image acquisition, or post-acquisition image processing, can be wholly housed in a body of the imaging device 102 or can be remotely located in whole or in part, and included as part of a network or communication channel that is also linked to the imaging device 102.

In order to provide high quality images of a surface of an object, the machine vision system 100 includes a lighting arrangement 108 that is configured to illuminate the target area 104 with different types of light that are projected into the target area 104 from different directions. In particular, in the illustrated example, the lighting arrangement 108 is configured as a ring light that can simultaneously project four different types of light 110a-110d onto the target area 104 from four different sides of the target area 104. Accordingly, a box 112 or other object within the target area 104 can be simultaneously illuminated with the four types of light 110a-110d from four different sides of the box 112.

In some embodiments, projecting different types of light with relatively large angles of incidence can result in high quality resulting images, such as may be readily provided by a ring light arrangement or other similar configuration (e.g., a controllable mirror system). In other embodiments, however, other configurations are possible, including those that can also provide improved lighting of objects for acquisition of images that show fine surface details. For example, some lighting arrangements or methods of implementation can be configured to simultaneously project different (or the same) types of light or numbers of types of light as the lighting arrangement 108 (e.g., at least three light types). Similarly, some lighting arrangements or methods of implementation can be configured to simultaneously project different (or the same) types of light from a different (or the same) number of directions (e.g., at least three different directions). In some embodiments, a different configuration of light sources can be used than is illustrated for the lighting arrangement 108. For example, instead of a ring light, some embodiments can include non-ring lights that are installed similarly to the lighting arrangement 108, lighting attachments for an imaging device, lighting arrangements that are integrated into an imaging device, lighting arrangements with one or more fixed or movable mirrors, and so on. In some embodiments, an imaging device or larger machine vision system can including a lighting system with a plurality of lighting arrays that are configured to illuminate an object from a plurality of sides. For example, a lighting system can include a first, second, and third arrays of one or more light sources (e.g., with multiple light sources per array) that are arranged on first, second, and third sides of an optical axis for imaging.

Although a variety of lighting arrangements and control approaches are possible, some arrangements or approaches may be particularly well suited to particular contexts or goals. For example, if three-dimensional (3D) analysis is desired, it may generally be necessary to use at least four types of light, as projected from at least four different directions. In contrast, if two-dimensional (2D) or one-dimensional (1D) analysis is desired, it may generally be necessary to use at least three or at least two types of light, respectively, as projected from at least three or at least two different directions.

During an image acquisition, the processor device 106 can control the lighting arrangement 108 and the imaging device 102 to execute a single image acquisition of the target area 104, from a single imaging direction (i.e., along an optical axis 114). For example, the imaging device 102 can be controlled to expose one or more imaging sensors therein to the four types of light 110a-110d that the lighting arrangement 108 has projected onto the box 112 from four respective sides of the box 112.

In some cases, as shown in FIG. 1, the lighting arrangement 108 can be controlled to simultaneously project the four types of light 110a-110d onto the box 112 from four perpendicularly opposed sides of the box 112, such that the box 112 is illuminated from four different sides with four different types of light for a single image acquisition (and with the box 112 in a single location). Correspondingly, by selectively excluding (e.g., filtering) the different types of light 110a-110d, the imaging device 102 can acquire four different sub-images of the box 112 as part of the single image acquisition, with each sub-image representing the box 112 as primarily illuminated (e.g., by 50% to 70% or more of total intensity) by the light of a particular one of the types of light 110a-d, as projected primarily from the corresponding illumination direction. (As generally noted above, in some implementations, including those similar to the implementation discussed with respect to FIG. 1 or otherwise generally disclosed herein, different sub-images can be acquired with distinguishable non-overlap between different light types, rather than merely with primary illumination from different light types.) Using known techniques of image analysis, a single image of the surface can then be generated based on the pixel data from each of the sub-images, as acquired in the single image acquisition.

Generally, different types of light can be generated in a variety of ways, including known types of light sources and filtering materials or structures. Some embodiments can include different types of light sources (e.g., LEDs tuned to different wavelengths). Some embodiments can include an arrangement of one or more filters relative one or more light arrays, including light arrays of a single type of light source. Some embodiments can be configured to provide light of different types by providing light of different polarization orientations.

In this regard, for example, the lighting arrangement 108 may include filters (not shown) that can allow the lighting arrangement 108 to project the types of light 110a-110d with four different polarization orientations (e.g., orientations distributed evenly or arbitrarily around 180° or another interval) or otherwise distinguishable light types. In some embodiments, use of polarization can be particularly useful, including because this approach may avoid contamination or other reduction in quality (e.g., loss) of sub-image data due to color features on a particular surface of an imaged target. However, other embodiments can beneficially use other types of light, including light that is projected from different directions with arbitrarily distributed distinguishably non-overlapping polarization orientations, light that is primarily (e.g., 70% or more) within different wavelength bands (e.g., primarily red, primarily blue, and primarily green visible light), or light that otherwise exhibits distinguishable non-overlap relative to wavelength bands. Further, as also discussed below, a variety of different numbers of light types (e.g., different numbers of types of polarized light, with any number of different sets of polarization orientations) can be used in different embodiments.

Generally, different types of light can be preferably (e.g., primarily) utilized for acquisition of associated different sub-images using a variety of techniques. For example, different types of light can be filtered for acquisition of appropriate sub-images by arranging one or more appropriate filters (e.g., as filtering layers) between an object and a relevant imaging sensor. As also discussed below, a variety of different filter arrangements are possible. For example, a set of filters to provide different light types can be integrated into an imaging device or can be arranged as separate components of a larger imaging system. In some embodiments, filters can be stationary and can be permanently or removably fixed to an imaging device or lighting arrangement.

Some embodiments can use specialized lights or imaging sensors to provide and acquire sub-images for different types of light. Some embodiments can use general purpose lighting arrangements for imaging, including as arranged for use with separate (or integrated) filters to provide different types of light. For example, a first set of removable (or other) filters can be disposed between a conventional light source and a target area and a second set of removable (or other) filters can be disposed between the target area and a conventional imaging sensor (or sensors). In some cases, filters can be used with a general purpose lighting device to project light with different polarization (e.g., linear, elliptical, or circular polarization with different orientations), different colors, or other different characteristics.

As alluded to above, the different sub-images associated with different light types can be processed in a variety of ways in order to produce a combined (e.g., additive or subtractive) image of a relevant target. Generally, one or more imaging sensors with a collective array of pixel detectors can receive differently filtered incoming light at corresponding subsets of the pixel detectors. As necessary, including due to the imaging sensor(s) providing a correspondingly intermixed stream of pixel data, pixel data for each of the subsets of pixel detectors can then be identified as (e.g., separated into) corresponding sub-images, each primarily (or otherwise, e.g., based on distinguishable non-overlapping light) representing the target with respect to a particular type of light and a particular lighting direction. Once the sub-images have been identified (e.g., separated), corresponding pixels of the sub-images can then be combined, such as by subtracting, in various combinations, pixel data of one or more of the sub-images from spatially corresponding pixel data of one or more of the other sub-images. In some embodiments, techniques drawn from photometric stereo analysis can be used for this purpose, including as described in Photometric Method for Determining Surface Orientation from Multiple Images (Woodham, Robert J., Optical Engineering, 19(1), 191139 (1980)), which is incorporated herein by reference.

In the example illustrated in FIG. 1, the imaging device 102 is shown as a fixed-location imaging device, such as can be used for operations in which images of a moving object are acquired. For example, the target area 104 may be arranged on a conveyor (not shown), or may be an area for "presentation" mode scanning, in which a user presents an object for scanning by moving the object into a target area, and so on. In some embodiments, the machine vision system 100 can include a portable (e.g., handheld) vision device. For example, the imaging device 102 and the lighting arrangement 108 can be included as parts of a handheld reader that can be used on moving or stationary objects. In some embodiments, a lighting arrangement (e.g., the lighting arrangement 108) can be configured as a removable attachment for a handheld or other device.

As also noted above, some embodiments may in particular provide improvements over conventional approaches relative to contexts in which moving objects are imaged (or, equivalently, in which moving imaging devices are used). For example, the ability to acquire sub-images with a single image acquisition from a corresponding single perspective (e.g., as discussed above) can allow some embodiments to avoid the difficulties inherent to conventional approaches that require multiple image acquisitions of a moving object. In some cases, as also discussed above, these difficulties may include the need to computationally reconcile different imaging angles relative to the object, as are necessarily associated with multiple image acquisitions at different times, and such as may substantially complicate accurate representation of some surface features. In contrast, some embodiments disclosed herein can collectively analyze multiple sub-images from a single image acquisition in order to simply extract or enhance surface details, with each of the sub-images representing the target from the same imaging perspective (i.e., without relative movement of the object between sub-images).

Figure 2:
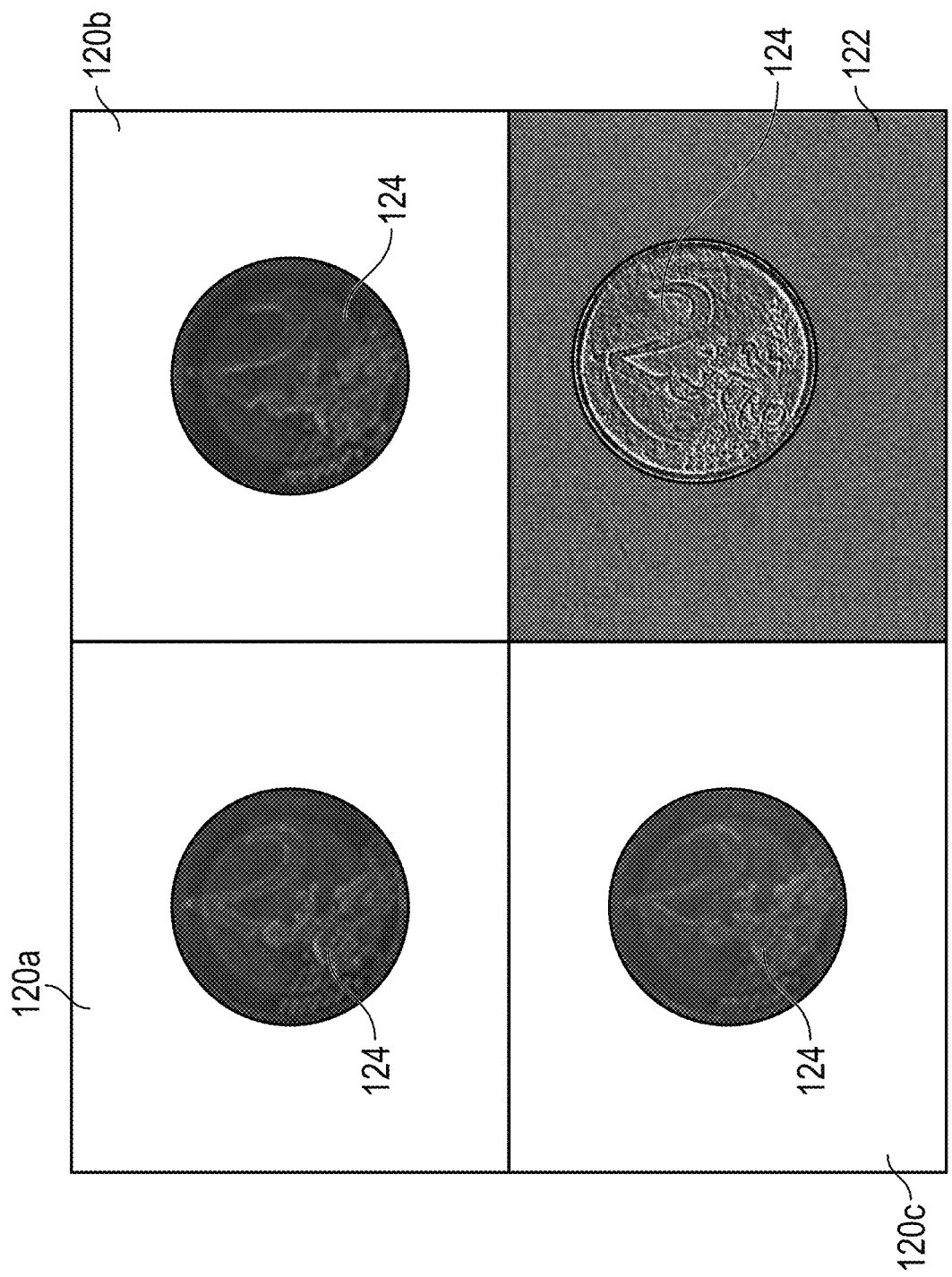
FIG. 2 shows examples of an image of surface features of an object, and of three associated sub-images, as generated and acquired, respectively, in accordance with some embodiments of the technology.

FIG. 2 shows an example set of sub-images 120a, 120b, 120c and an example image 122 of an object, as acquired and generated, respectively, according to some embodiments of the invention. For example, using the machine vision system 100, each of the sub-images 120a-120c may be acquired, corresponding respectively to one of the types of light 110a-110c (see FIG. 1). The image 122 can then be generated by the processor device 106 (see FIG. 1) based on the sub-images 120a-120c. It can be seen that the resolution of surface features 124 on the object within the image 122 is substantially improved relative to any one of the sub-images 120a-120c.

As noted above, the generated image 122 may in some cases be independently stored (e.g., in a memory) as a distinct image file or object. In some cases, the generated image 122 as shown in FIG. 2 may simply be a representation of image data provided collectively by the sub-images 120a-120c, which may be analyzed without necessarily being stored as a single file or object. For example, as also noted above, corresponding pixels of the sub-images 120a-120c may be analyzed collectively (e.g., as added together) as pixels of the generated image 122 without collectively saving the entire array of pixels of the generated image 122 as a distinct file or object. In this regard, for example, results of collective analysis of image data from the sub-images 120a-120c can sometimes be presented on a visible representation of the generated image 122, can sometimes be presented on a visible representation of one or more of the sub-images 120a-120c, and can sometimes be presented in other ways (e.g., as statistical or absolute parameters that characterize aspects of the imaged object).

In some cases, one or more additional sub-images (not shown) can be acquired and used to generate the image 122, such as a fourth sub-image (not shown) based on the light type 110d (see FIG. 1). In some cases, fewer sub-images can be acquired and used to generate the image 122, although this may correspond to a relative loss of resolution or of the ability to accurately represent 3D details.

As also noted above, the different types of light used in some embodiments can correspond to different types of polarized light. For example, in the machine vision system 100 (see FIG. 1), the lighting arrangement 108 may be configured to provide the light types 110*a*, 110*d* as polarized light with perpendicular orientations, relative to each other. Accordingly, the sub-images 120*b* and 120*c* as primarily illuminated from opposing sides of the surface features 112*d* can be acquired using primarily perpendicularly polarized light. Similarly, the light types 110*b*, 110*c* can be provided as polarized light with polarization orientations that are perpendicular relative to each other and rotated by 45° relative to the light types 110*a*, 110*d*. Accordingly, the sub-image 120*a* can be acquired using primarily polarized light that is rotated by 45° relative to the primarily utilized light for the sub-images 120*b*, 120*c* and, as appropriate, that is perpendicularly polarized relative to light for another opposed-perspective sub-image (not shown). As also discussed below, in some embodiments, this arrangement may help to minimize leakage of light from opposing illumination directions into a particular sub-image (e.g., of the light type 110*c* into the sub-image 120*b*) and thereby help to maximize resolution of surface features. In other embodiments, however, other arrangements are possible.

Figure 3A:
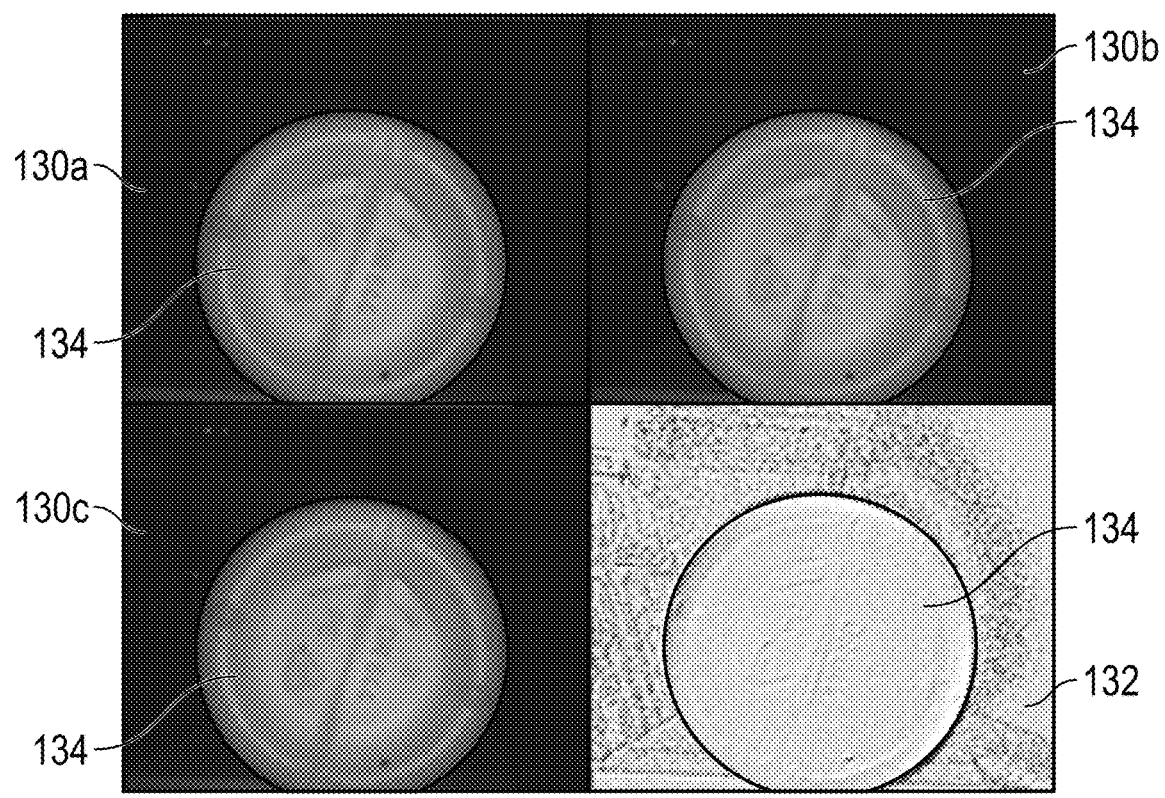
FIG. 3A shows examples of multiple images acquired and generated using a conventional imaging system.
Figure 3B:
FIG. 3B shows examples of an image of surface features of a similar object as shown in FIG. 3A and of three associated sub-images, as generated and acquired, respectively, in accordance with some embodiments of the technology.

As also discussed above, the systems and methods described herein, including single image acquisition using differently polarized light projected from different directions, can provide notable improvements over conventional approaches. An example of this improvement is illustrated in FIGS. 3A and 3B. FIG. 3A shows a set of sub-images 130*a*-130*c* and an associated generated image 132 of an object 134, as acquired using a conventional imaging system. In contrast, FIG. 3B shows a set of sub-images 140*a*-140*c* and an associated generated image 142 of the object, as acquired using an imaging system according to a disclosed embodiment (e.g., the machine vision system 100). In some embodiments, the sub-images 140*a*-140*c* can be acquired, respectively, using light that is projected from different directions and has different polarization orientations or different wavelength bands, although other approaches (e.g., with other different types of light) are also possible.

With reference to the generated images 132, 142, it can be seen that surface features of the object 134 are represented with substantially greater contrast and detail in the image 142. In particular, the surface slope of the surface features of the object 134 are represented in the generated image 142, with a high level of detail, as differences in grey values in the image (e.g., with greater surface slope corresponding to lighter grey values), although other approaches may be used in other implementations. Correspondingly, analysis of the surface features using machine vision techniques, including inspection of 3D surface features represented in the image, may proceed more efficiently and successfully with regard to the image 142 than with regard to the image 132.

Figure 4:
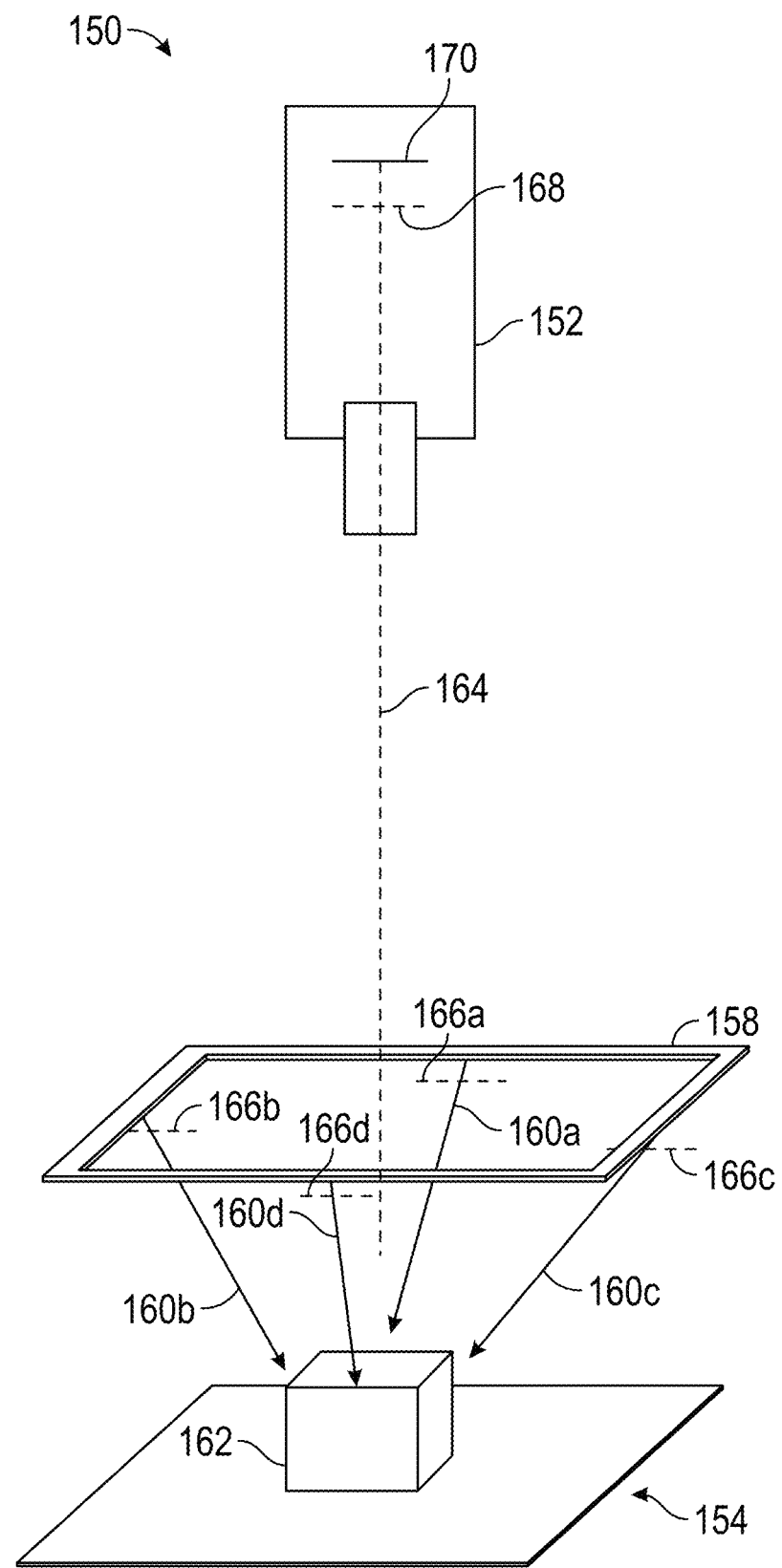
FIG. 4 is a schematic view of another imaging system that includes a lighting arrangement and an imaging device, in accordance with some embodiments of the technology.

In some embodiments, as also discussed above, a single image acquisition, with multiple types of light being projected from multiple directions to provide multiple sub-images, can be implemented using a single imaging device, such as a fixed- or movable-body imaging device with a single imaging sensor. An example of such an arrangement is illustrated in FIG. 4. In particular, a machine vision system 150 includes a single (e.g., fixed-location) imaging device 152 that is configured to capture images of a target area 154 as illuminated by a lighting arrangement configured as a ring light 158. The ring light 158 is configured to provide four different types of light 160*a*-160*d* from four sides of an object 162 within the imaging area 154, as provided by an array of light sources (not shown) and four separate pre-surface filters 166*a*-166*d* that are arranged on respective sides of the ring light 158 between the light sources and the target area 154. Further, an arrangement of one or more post-surface filters 168 is located along an optical axis 164 between the target area 154 and a single imaging sensor 170. In particular, the one or more post-surface filters 168 are configured to selectively primarily pass each of the types of light 160*a*-160*d* for impingement on a respective subset of pixel detectors (not shown) of the imaging sensor 170. Accordingly, via a single image acquisition along a single optical axis 164, the imaging device 152 can acquire four different sub-images (not shown) of a surface of the object 162, each of which is primarily informed by a different type of light and different illumination direction. The sub-images can then be processed collectively in order to generate a single, detailed image of surface features of the object 162 (e.g., as described above).

In some embodiments, multiple imaging sensors can be provided as part of the imaging device 152. In some embodiments, light types of different polarization or different wavelengths can be used, or a different number of light types or associated lighting directions can be used. In some embodiments, the number of different light types may not exactly correspond to the number of illumination directions. In some embodiments, a lighting arrangement can be structurally differently than the ring light 158, such as by being integrated into the imaging device 152. In some embodiments, the imaging device 152 and, as appropriate, the ring light 158 or other lighting arrangement, can be configured to be movable, such as by being included in a handheld surface inspection device. In some embodiments, the post-surface filter(s) 168 can be configured as a single-layer filter with different filtering regions that correspond to respective pixel detector subsets of the imaging sensor 170. In some embodiments, one or more post-surface filters can be configured otherwise, including as a set of multiple filters that are disposed in an array to pass particular types of light for primary illumination of particular pixel detector subsets, or as a multi-layer single filter.

Figure 5A:
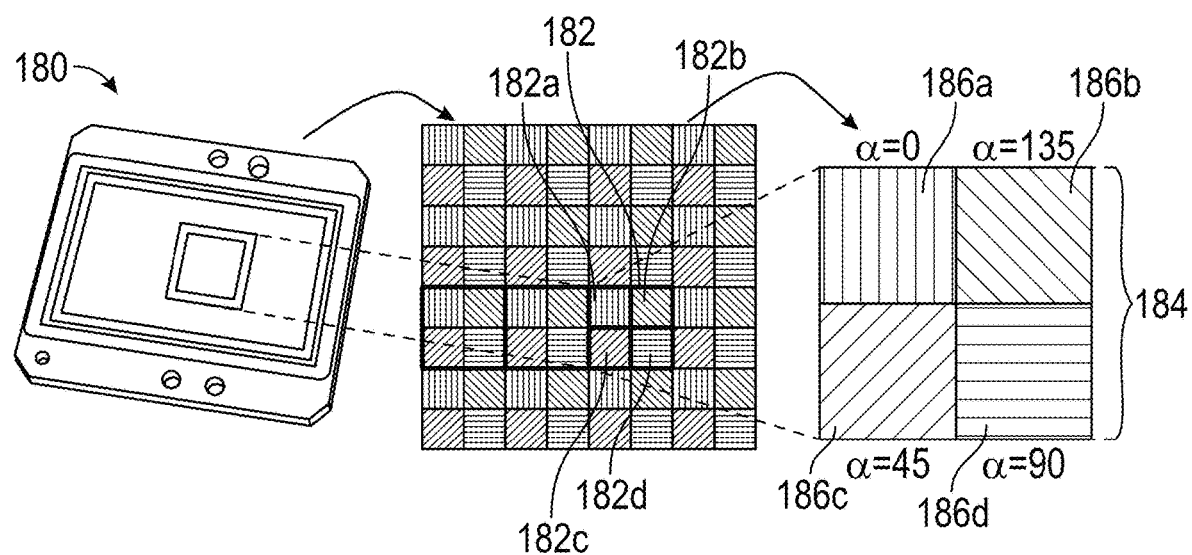
FIG. 5A is a schematic view of aspects of an imaging sensor for use in systems (and methods) in accordance with some embodiments of the technology.

FIG. 5A illustrates an example imaging sensor 180 that can be used as part of the machine vision system 150, the machine vision system 100, or other imaging systems according to embodiments of the technology. In particular, the imaging sensor 180 includes an array of multiple super-pixel detector arrays 182. Further, each of the super-pixel detector arrays 182 includes a plurality of pixel detectors (e.g., at least three pixel detectors) with an associated (e.g., integrated) filter array 184 that includes filters arranged to selectively pass primarily a particular, distinct type of light, to be sensed by a respective one (or more) of the pixel detectors within each of the detector arrays 182. (As generally discussed above, some filter arrangements can be configured to allow acquisition of sub-images with distinguishable non-overlap between light types, including with results other than illumination of a particular set of pixel detectors with primarily one type of light.)

In the illustrated embodiment, each of the detector arrays 182 includes four pixel detector subsets 182*a*-182*d*, each arranged to provide data for a respective pixel of an associated sub-image (not shown) for a particular single image acquisition, although other configurations are possible. Similarly, each of the filter arrays 184 includes four different filters 186*a*-*d*, each configured to primarily pass light of a different type, although other configurations are possible (including other configurations to pass distinguishably non-overlapping light types). Accordingly, when a single image acquisition operation admits light of four different types, including as may have been projected from four different illumination directions onto a target that is to be imaged, the imaging sensor 180 can acquire and output data for four different sub-images of the target, each primarily acquired using light of a particular type and illumination direction. The sub-images can then be processed together in various ways (e.g., as discussed above), to generate a single combined image to appropriately represent fine details of surface features of the target.

Although a variety of filter types are possible, in the illustrated example, the filter arrays 184 are configured to filter light of different polarization orientations. In particular, the filter arrays 184 are arranged to selectively pass primarily light of each of four different linear polarization orientations, to impinge respectively on the four different pixel detector subsets 182a-182d, while filtering out light of the other polarization orientations, although other configurations are possible. Further, the filter arrays 184 are configured to primarily pass light with polarization orientations that are distributed around 180° (e.g., with regularly distributed 45° differences, as shown). Although, again, other configurations are possible, this type of arrangement may usefully help to minimize leakage of light of one type (e.g., a particular polarization orientation) into a sub-image that is primarily associated with light of a different type (e.g., a different polarization orientation). This, in turn, may help to improve the quality of the resulting image generated based on the sub-images.

Further, as also noted above, the use of light of different polarization may help to avoid loss of relevant data or inclusion of erroneous data due to surface colors on a target. In other embodiments, however, other configurations are possible. For example, although the filter array 184 is shown as a polarization filter array, other filter types such as similarly configured Bayer filters (e.g., with three pixel detector subsets per filter array) for light of different colors (i.e., wavelength bands) or other filters for other types of light.

As illustrated, the detector arrays 182 are themselves arrayed in a regular, interleaved pattern across the imaging sensor 180. In other embodiments, however, other configurations are possible. For example, some configurations may include arrays of subsets of pixel detectors in which multiple pixel detectors for a particular type of light are arranged immediately adjacent to each other. In some embodiments, possible patterns of pixel detector subset arrays may be limited based on the number of types of light that are to be used. In some embodiments, a greater number of subsets of pixel detectors (e.g., with associated filters) may be included than the number of types of light that can be used for a particular image acquisition. For example, although the detector arrays 182 are configured to separately detect four different types of light, the imaging sensor 180 can be used in some implementations to acquire images (and sub-images) using a different number of light types (e.g., at least three types of light).

Figure 5B:
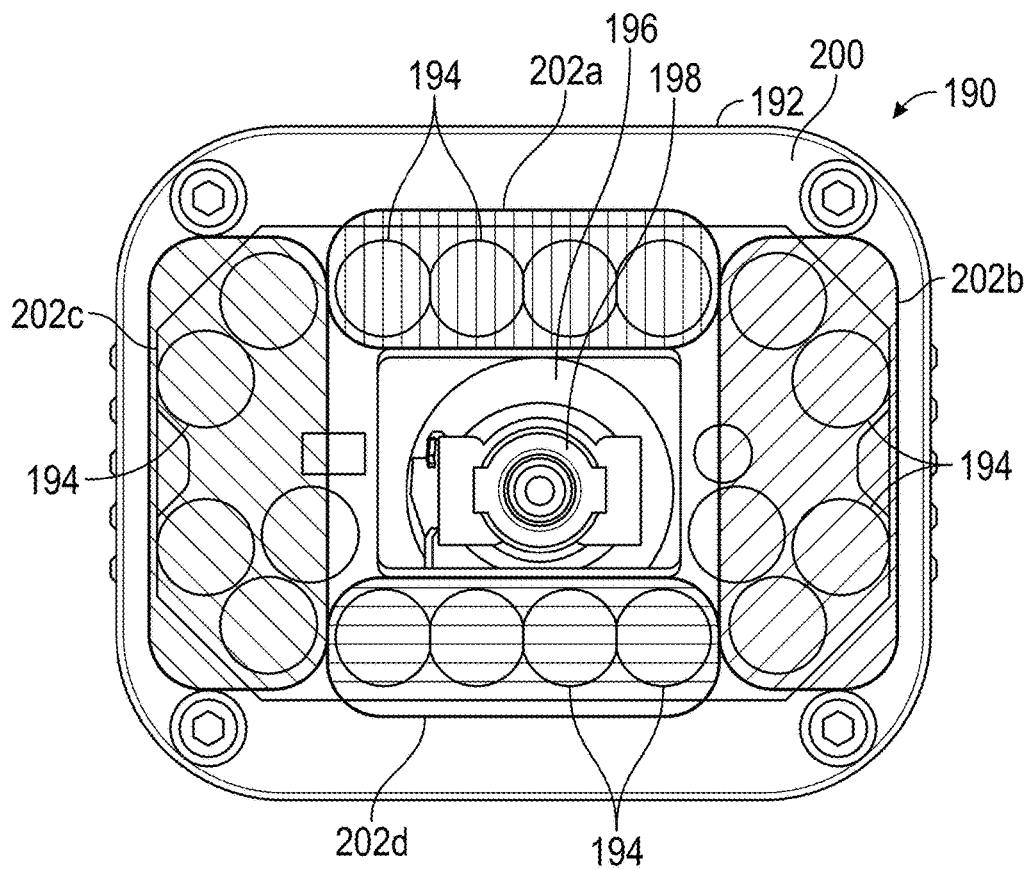
FIG. 5B is a front plan view of an imaging device with a lighting attachment, in accordance with some embodiments of the technology.

FIG. 5B shows example imaging device 190 with an integrated lighting attachment 192 that can be used in combination with an imaging sensor and appropriate filters (e.g., as shown in FIG. 5A) to acquire different sub-images of an object, as part of a single image acquisition, for use to generate a single generated image (e.g., as also generally described above). In particular, the lighting device 192 includes a set of integrated light sources 194 (e.g., single- or multi-color LED arrays) that are arranged on different respective sides around an image-acquisition opening 196 and lens arrangement 198 of the imaging device 190 that together define an imaging axis (not shown). Further, a removable cover 200 of the imaging device 190 includes a set of filters 202a-d that are configured to overlay the light sources 194 when the cover 200 is attached to the imaging device 190. Thus, the imaging device 190 can illuminate a particular object (not shown in FIG. 5B) with light of four different types as projected from four different orientations (e.g., from four different sides of the object). With the imaging sensor 180 (see FIG. 5A), incoming light from a single image acquisition can accordingly be filtered to provide four sub-images, each of which are primarily associated, respectively, with light from a different one of the four filters 202a-d. The four sub-images can then be collectively processed to generate an image with detailed surface representations.

In the illustrated embodiment, the four filters 202a-d of the four discrete sets of discrete light sources are arranged in an array with four discrete quadrants on four discrete portions of the cover 200. Similarly, each of the four filters 202a-d provides a discrete filtering region with a different polarization orientation, with opposing filters 202a, 202d and 202b, 202c providing perpendicular polarization orientations relative to each other. In some embodiments, as also discussed above, this arrangement may result in particularly high quality images of surface features, including as a result of the possible minimization of leakage into a particular sub-image of light from an opposing direction, due to the projection of the most relatively distinctive light types (e.g., light of perpendicular polarization orientations) onto the target from opposing directions.

In other embodiments, however, other types of filters or other numbers or arrangements of filtering regions are possible. For example, in some configurations, perpendicularly orientated polarization filters may be located adjacent to each other or otherwise arranged so as to allow the resulting light types to be projected onto a target from adjacent directions. In some cases, such an arrangement may be useful for particular surface types, features, or orientations. Further, as another example, some embodiments can use multiple light types having effectively any set of different polarization orientations, including polarization orientations that are arbitrarily distributed around an angular range.

As shown in a comparison between FIGS. 5A and 5B, the polarization orientations (or directions) of the filter arrays 184 are substantially identical to the polarization orientations of the filters 202a-d, with each ranging over 180° with relative separation of 45° (i.e., are identical to within generally acceptable manufacturing tolerances for the industry). Further, the polarization orientations of the filter array 184 relative to each one of the pixel detector subsets 182a-d are configured to be substantially in phase with the polarization orientation of a corresponding one of the filters 202a-d. In some embodiments, this may allow for maximized use of incoming light of a particular type for each of the associated sub-images. In other embodiments, however, other configurations are possible. For example, the polarization orientations of a filter for an imaging sensor (or sensors) can be rotated to be out of phase with a polarization orientation of a corresponding incoming type of light. In this regard, appropriately good image quality can be maintained in some configurations so long as the relative separation between the polarization orientations for an imaging sensor (or sensors) are the same as the relative separation between the polarization orientations of the incoming types of light. Similar considerations can also apply relative to other types of light, including in implementations that utilize elliptical or circular polarization, rather than linear polarization, in configurations that are otherwise similar to those shown in FIGS. 5A and 5B.

In some cases, as also alluded to above, there may be some amount of data that is common between different sub-images, despite the primary (or distinguishably non-overlapping) use of different types of light to acquire the sub-images. For example, the polarization filters of the filter array 182 (see FIG. 5A) are arranged to primarily pass light of a particular polarization orientation, light polarized with a similar orientation (e.g., 45 degrees different) may still pass a particular filter to some extent. Accordingly, some light that is polarized with a particular orientation and projected from a particular direction onto an object may reflect off of the object and be acquired by pixel detectors as part of a sub-image that is primarily associated with light having a different polarization orientation and a different projected direction. In some cases, including when light of a main type (e.g., a particular polarization orientation) is predominant within a sub-image, sub-images can be processed as discussed above while effectively ignoring additional light of a different type (e.g., by assuming that all light that impinges on a pixel detector subset is of only a single type). In some implementations however, additional processing steps can be taken in this regard.

As also noted above, some embodiments can be configured to acquire sub-images with multiple imaging sensors. For example, some embodiments can include multiple imaging devices, each having at least one imaging sensor configured to acquire at least one sub-image that is primarily associated with at least one type of light and at least one corresponding lighting direction. Similarly, some embodiments can include a single imaging device with multiple imaging sensors, each of which is configured to acquire at least one sub-image that is associated with at least one type of light and at least one corresponding lighting direction.

Figure 6:
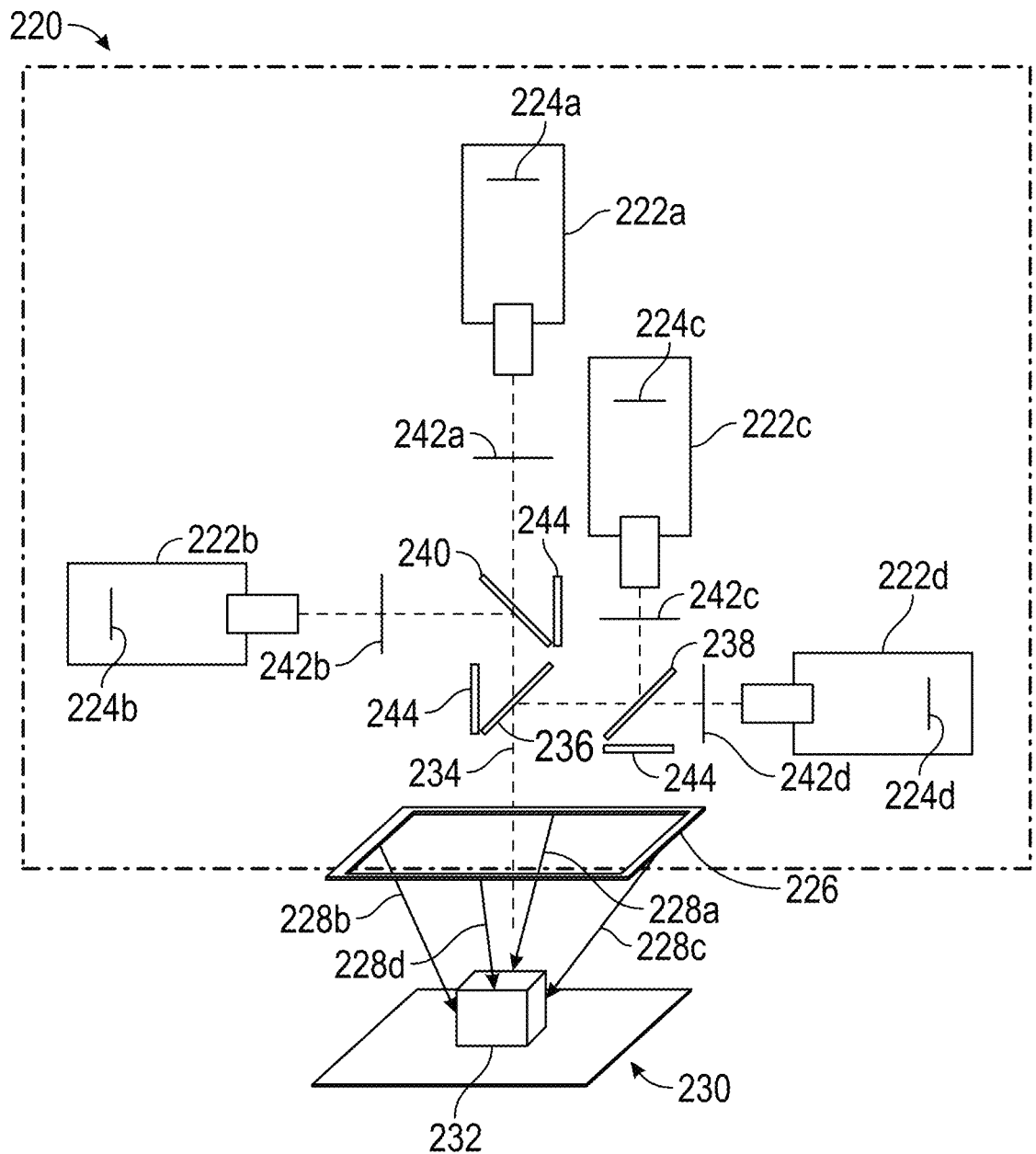
FIG. 6 is a schematic view of yet another imaging system (and method) that includes a lighting arrangement and an imaging device, in accordance with some embodiments of the technology.
Figure 7:
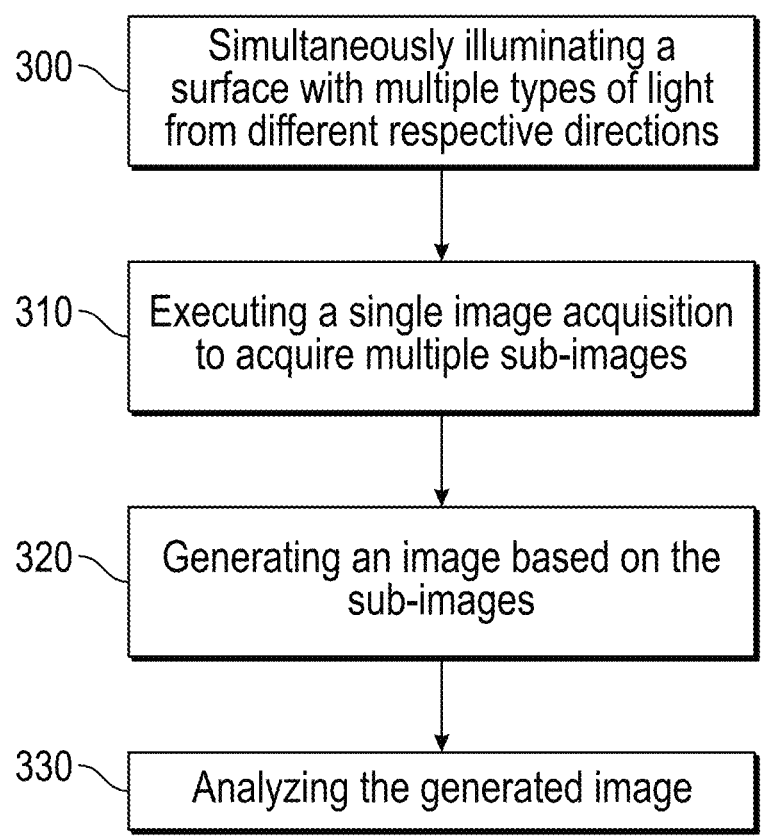
FIG. 7 is a schematic view of a method for acquiring and analyzing an image, in accordance with some embodiments of the technology.

FIG. 6 shows example machine vision system 220 according an embodiment of the disclosed technology, with multiple imaging devices 222*a-d*, each having a distinct imaging sensor 224*a-d*. The machine vision system 220 also includes a ring light 226 that is configured to project four different types of light 228*a-d* onto a target area 230 from four corresponding directions, although other lighting arrangements are possible. With this arrangement, the types of light 228*a-d*, as projected for a single image acquisition, can reflect off of an object 232 within the target area 230 to travel initially towards the imaging devices 222*a-d* along a single optical axis 234. Upon reaching a first beam splitter 236, which is disposed along the optical axis 234 and can be configured as any of a variety of known types of beam splitters, the light can be split into two distinct (e.g., perpendicular) paths. Each of these paths then intersects another beam splitter 238, 240, respectively, resulting in further division of the light into a total of four distinct optical axes, each of which is aligned with a lens arrangement and the imaging sensor 224*a-d* of a respective one of the imaging devices 222*a-d*.

Additionally, a respective one of four distinct filters 242*a-d* is arranged along each of these four optical axes. Accordingly, light of each of four (or fewer) particular types, as admitted into the machine vision system as part of a single image acquisition, can be primarily passed for the acquisition of a particular sub-image by a particular associated one of the imaging sensors 224*a-d*. An electronic controller (not shown) can then collectively process the resulting sub-images, as separately acquired by the imaging devices 222*a-d* in a single collective image acquisition, in order to generate a combined image with high quality representation of surface features of the object 232.

In different embodiments, the principles illustrated in FIG. 6, including the use of beam splitters to direct light of multiple (e.g., at least three different) types onto one or more imaging sensors for acquisition of multiple (e.g., at least three) sub-images, can be implemented in combination with or as a substitution for other example arrangements discussed herein. Correspondingly, although the imaging devices 222*a-d* are illustrated as separate devices in FIG. 6, some embodiments can include a larger imaging device with a similar internal arrangement, in which each of multiple imaging sensors or each of multiple sub-sections of a single imaging sensor is configured to acquire a respective sub-image, for a single image acquisition, using a respective type of light and an associated respective illumination direction. Similarly, although the filters 242*a-d* are illustrated as being located outside of the imaging devices 222*a-d* (e.g., as may result from the use of removable covers), filters in other configurations can be arranged at a variety of other locations along the various imaging axes, in order to selectively primarily pass a particular type of light for acquisition of a particular sub-image (and selectively primarily exclude other types of light). Other arrangements of beam splitters can also be used in other embodiments, and other components, including blocking arrangements such as light shields 244*a-d*, can be associated with particular beam splitters or other imaging devices as appropriate, in order to ensure appropriate transmission of relevant information for sub-image acquisitions.

Consistent with the discussion above, some embodiments can include a method of acquiring images of surface features of a surface of an object, including as may be implemented using one or more of the machine vision systems 100, 150, 220 (or other systems) disclosed herein. As generally illustrated in FIG. 6, for example, a surface can be simultaneously illuminated 300 with multiple types of light from different respective directions, e.g., with a first type of light from a first direction and with a second, different type of light from a second, different direction. A single image acquisition of the illuminated surface can then be executed 310, including, for example: acquiring a first sub-image using the first type of light and at least partly excluding the second type of light and acquiring a second sub-image using the second type of light and at least partly excluding the first type of light. An image of the surface can be generated 320, including the surface features of interest, based on the first and second sub-images. Finally, as appropriate, the generated 320 image can be analyzed 330 using any variety of known image analysis techniques.

In some implementations, the method can include other aspects, as further detailed below.

In some implementations, acquiring the first sub-image can include filtering the second type of light to at least partly exclude the second type of light from the first sub-image and acquiring the second sub-image can include filtering the first type of light to at least partly exclude the first type of light from the second sub-image.

In some implementations, the single image acquisition can be executed using one or more imaging sensors. The first sub-image can be acquired based on filtering the second type of light before the second type of light reaches the one or more imaging sensors. The second sub-image can be acquired based on filtering the first type of light before the first type of light reaches the one or more imaging sensors.

In some implementations, the first type of light can be polarized with a first polarization orientation and the second type of light can be polarized with a second polarization orientation that is different than the first polarization orientation.

In some implementations, the first and second types of light can be linearly polarized.

In some implementations, the first and second types of light can be circularly polarized.

In some implementations, the first and second types of light can be elliptically polarized.

In some implementations, the first polarization orientation can be at least 45 degrees offset relative to the second polarization orientation.

In some implementations, the first type of light can be polarized before reaching the surface using a first polarization filter and the second type of light can be polarized before reaching the surface using a second polarization filter, with the first and second polarization filters having a first angular polarization separation relative to each other.

In some implementations, the first sub-image can be acquired based on filtering the second type of light, after the second type of light leaves the surface, with a third polarization filter, and the second sub-image can be acquired based on filtering the first type of light, after the first type of light leaves the surface, with a fourth polarization filter. The third and fourth polarization filters can have a second angular polarization separation relative to each other that is the same as (or different from) the first angular polarization separation.

In some implementations, the third and fourth polarization filters can be phase shifted relative to the first and second polarization filters, respectively.

In some implementations, the first type of light can be primarily within a first wavelength band and the second type of light can be primarily within a second wavelength band that does not overlap with the first wavelength band.

In some implementations, the surface can be illuminated with a third type of light from a third direction, simultaneously with the illumination of the surface with the first and second types of light. The third type of light can be different from the first and second types of light and the third direction can be different from the first and second directions. In this regard, executing the single image acquisition can further include acquiring a third sub-image using the third type of light. Generating the image of the surface can be further based on the third sub-image.

In some implementations, the surface can be illuminated with a fourth type of light from a fourth direction, simultaneously with the illumination of the surface with the first, second, and third types of light. The fourth type of light can be different from the first, second, and third types of light and the fourth direction can be different from the first, second, and third directions. In this regard, executing the single image acquisition can include acquiring a fourth sub-image using the fourth type of light. Generating the image of the surface can be further based on the fourth sub-image.

In some implementations, the first and second types of light can be provided using a ring light.

In some implementations, the first and second sub-images can be acquired based on light received at a single imaging sensor. The first sub-image can be acquired based on filtering the second type of light relative to a first subset of pixel detectors of the single imaging sensor. The second sub-image can be acquired based on filtering the first type of light relative to a second subset of pixel detectors of the sensor.

In some implementations, the first and second sub-images can be acquired based on light received at a first imaging sensor and a second imaging sensor, respectively.

In some implementations, the first sub-image can be acquired based on filtering the second type of light before the second type of light reaches the first imaging sensor. The second sub-image can be acquired based on filtering the first type of light before the first type of light reaches the second imaging sensor.

Some embodiments can include an imaging system for acquiring images of surface features of a surface of an object, examples of which are represented by, or applicable to variations of, one or more of the machine vision systems 100, 150, 220 (or other systems) disclosed herein. One or more light sources can be configured to simultaneously illuminate the surface with a first type of light from a first direction and with a second type of light from a second direction. The first and second types of light and the first and second directions can be different from each other. One or more imaging sensors can be configured to simultaneously acquire first and second sub-images of the surface. The first sub-image can be acquired using the first type of light and at least partly excluding the second type of light and the second sub-image can be acquired using the second type of light and at least partly excluding the first type of light. One or more processor devices can be configured to generate an image of the surface, including the surface features, based on the first and second sub-images.

In some embodiments, the imaging system can include other aspects, as further detailed below.

In some embodiments, the one or more light sources can be configured to provide the first type of light with a first polarization orientation and to provide the second type of light with a second polarization orientation that can be different from the first polarization orientation.

In some embodiments, tone or more filters can be arranged to be between the one or more imaging sensors and the surface. The one or more filters can be configured to filter the first and second types of light for the second and first sub-images, respectively.

In some embodiments, the one or more filters can include a first post-surface polarization filter configured to pass light of a first polarization orientation for acquisition of the first sub-image and a second post-surface polarization filter to pass light of a second polarization for acquisition of the second sub-image.

In some embodiments, the first polarization orientation can be at least 45 degrees offset relative to the second polarization orientation.

In some embodiments, the first polarization can be 90 degrees offset relative to the second polarization orientation.

In some embodiments, at least one of the first or second polarization filters can be a linear polarization filter.

In some embodiments, at least one of the first or second polarization filters can be a circular polarization filter.

In some embodiments, at least one of the first or second polarization filters can be an elliptical polarization filter.

In some embodiments, first and second pre-surface filters can be configured to provide the first and second polarization orientations to light from the one or more light sources, respectively.

In some embodiments, the first and second pre-surface filters can be phase shifted relative to the first and second post-surface filters, respectively.

In some embodiments, the one or more filters can include a first post-surface polarization filter configured to pass light of a first wavelength band for acquisition of the first sub-image and a second post-surface polarization filter to pass light of a second wavelength for acquisition of the second sub-image.

In some embodiments, the one or more light sources can be configured to simultaneously further illuminate the surface with a third type of light from a third direction and with a fourth type of light from a fourth direction The one or more imaging sensors can be configured to also simultaneously acquire third and fourth sub-images of the surface. The third sub-image can be acquired using the third type of light, and the fourth sub-image can be acquired using the fourth type of light. The one or more processor devices can be configured to generate the image of the surface also based on the third and fourth sub-images.

In some embodiments, the first, second, third, and fourth types of light can have first, second, third, and fourth polarization orientations, respectively. The first, second, third, and fourth directions can correspond to first, second, third, and fourth sides of the object.

In some embodiments, the first side can be opposite the third side and the first polarization orientation can be perpendicular to the third polarization orientation.

In some embodiments, the second side can be opposite the fourth side and the second polarization orientation can be perpendicular to the fourth polarization orientation.

In some embodiments, the one or more imaging sensors can include a single imaging sensor configured to acquire the first and second sub-images on first and second subsets of pixel detectors.

In some embodiments, one or more filters can be configured to filter the second type of light relative to the first subset of pixel detectors and to filter the first type of light relative to the second subset of pixel detectors.

In some embodiments, the one or more imaging sensors can include a first imaging sensor configured to acquire the first sub-image and a second imaging sensor configured to acquire the second sub-image.

In some embodiments, a beam splitter can be configured to direct light received from the surface to the first and second imaging sensors. A first filter can be configured to filter the second type of light relative to the first imaging sensor. A second filter can be configured to filter the first type of light relative to the second imaging sensor.

Some embodiments can include a surface inspection device, examples of which can utilize, be represented by, or be applicable to variations of, one or more of the machine vision systems 100, 150, 220 (or other systems) disclosed herein. An imaging device can include one or more imaging sensors that include at least three subsets of pixel detectors. A lighting arrangement can include one or more light sources arranged to illuminate a target area with at least three types of light from at least three directions. Each of the at least three types of light can have a different polarization orientation relative to the other at least two types of light and can be directed towards the target area from a different one of the at least three directions than the other at least two types of light. A filter arrangement can be arranged to selectively filter each of the at least three types of light relative to a corresponding one of the at least three subsets of pixel detectors. The one or more processing devices can be configured to execute a single acquisition of an object in the target area, including acquiring at least three sub-images corresponding to the at least three subsets of pixel detectors.

In some embodiments, the surface inspection device can include other aspects, as further detailed below.

In some embodiments, the imaging device can further include one or more processing devices that can be configured to generate an image of a surface of the object based on each of the at least three sub-images. Generating the image can include subtracting pixel values of one of the at least one sub-images from pixel values of another of the at least one sub-images.

In some embodiments, the lighting arrangement can be a light ring.

In some embodiments, the lighting arrangement can be a lighting attachment that can be configured to be removably secured to an imaging body that encloses the one or more imaging sensors.

In some embodiments, the lighting attachment can include an array of light sources arranged around an image-acquisition opening and at least three polarization filters aligned with the array of light sources.

In some embodiments, the lighting attachment can include four polarization filters aligned with the array of light sources such that four types of polarized light can be provided. The one or more imaging sensors can include four subsets of pixel detectors. The execution of a single acquisition of an object in the target area can include acquiring four sub-images corresponding to the four subsets of pixel detectors.

In some embodiments, each of the attachment polarization filters can have a different polarization orientation.

In some embodiments, first and second attachment polarization filters of the attachment polarization filters can be arranged on first and second opposite sides of the image-acquisition opening and can have perpendicular polarization orientations relative to each other.

In some embodiments, third and fourth attachment polarization filters of the attachment polarization filters can be arranged on third and fourth opposite sides of the image-acquisition opening, different from the first and second opposite sides, and can have perpendicular polarization orientations relative to each other.

In some embodiments, the imaging device can include four subsets of pixel detectors and the filter arrangement can include four sensor polarization filters each configured to pass polarized light from a respective one the attachment polarization filters.

In some embodiments, each of the sensor polarization filters can be in phase with the respective one of the attachment polarization filters.

In some embodiments, the attachment polarization filters can be removable from the lighting attachment to provide reconfigurable polarization of light from the array of light sources.

In some embodiments, the four subsets of pixel detectors can be included on a single imaging sensor.

In some embodiments, each of the four subsets of pixel detectors can be included on a different imaging sensor. A plurality of beam splitters can be arranged to direct light reflected from the object to each of the four subsets of pixel detectors.

The particular embodiments disclosed above are illustrative only, as the technology may be modified and practiced in different but equivalent manners apparent to those skilled in the art having the benefit of the teachings herein. Further, no limitations are intended to the details of construction or design herein shown, other than as described in the claims below. It is therefore evident that the particular embodiments disclosed above may be altered or modified and all such variations are considered within the scope and spirit of the technology. Accordingly, the protection sought herein is as set forth in the claims below.

What is claimed is:

1. A method of acquiring images of surface features of a surface of an object, the method comprising:
   simultaneously illuminating the surface with at least three types of light from at least three directions, each of the types of light illuminating the surface from a different one of the at least three directions;
   executing a single image acquisition of the illuminated surface using a single imaging device including one or more imaging sensors, including acquiring at least three sub-images, each of the at least three sub-images being acquired using a different one of the at least three types of light and at least partly excluding the at least two other types of light; and
   generating an image of the surface for three dimensional inspection, including the surface features, based on the at least three sub-images;
   wherein the surface is simultaneously illuminated with the at least three types of light using a set of light sources of the single imaging device and a set of filters that is on a cover of the imaging device and overlays the set of light sources.

2. The method of claim 1, wherein each of the at least three types of light has a different polarization orientation and wherein the at least three types of light are at least one of:
   linearly polarized;
   elliptically polarized; or
   circularly polarized.

3. The method of claim 2, wherein the at least three types of light include at least four types of light, each having a different polarization orientation;
   wherein executing the single image acquisition includes acquiring at least four sub-images, each of the at least four sub-images being acquired using a different one of the at least four types of light; and
   wherein generating the image of the surface is based on the at least four sub-images.

4. The method of claim 3, wherein simultaneously illuminating the surface with the at least four types of light include:
   illuminating the surface from first, second, third, and fourth sides with light of first second, third, and fourth polarization orientations, respectively;
   wherein the first side is opposite the third side, and the second side is opposite the fourth side.

5. The method of claim 4, wherein a difference between polarization orientations of the first and third polarization orientations is 90 degrees; and
   wherein a difference between polarization orientations of the second and fourth polarization orientations is 90 degrees.

6. The method of claim 1, wherein the at least three sub-images are acquired based on light that is received from the surface at a single imaging sensor;
   wherein a first of the sub-images is acquired based on at least partly excluding second and third types of light relative to a first subset of pixel detectors of the single imaging sensor;
   wherein a second of the sub-images is acquired based on at least partly excluding a first type and the third type of light relative to a second subset of pixel detectors of the single imaging sensor; and
   wherein a third of the sub-images is acquired based on at least partly excluding the first and second types of light relative to a third subset of pixel detectors of the single imaging sensor.

7. The method of claim 1, wherein the at least three sub-images are acquired based on light that is received from the surface at three or more imaging sensors;
   wherein a first of the sub-images is acquired based on at least partly excluding second and third types of light relative to a first of the imaging sensors;
   wherein a second of the sub-images is acquired based on at least partly excluding a first type and the third type of light relative to a second of the imaging sensors; and
   wherein a third of the sub-images is acquired based on at least partly excluding the first and second types of light relative to a third of the imaging sensors.

8. An imaging system for acquiring images of surface features of a surface of an object, the imaging system comprising:
   one or more light sources that are configured to simultaneously illuminate the surface with at least three types of light from at least three directions, each of the at least three types of light being different from the others of the at least three types of light and illuminating the surface from a different one of the at least three directions, wherein the one or more light sources includes a plurality of light sources included in a lighting attachment;
   one or more imaging sensors that are in a single imaging device and are coupled to the lighting attachment and configured to execute a single image acquisition of the illuminated surface, including acquiring at least three sub-images, each of the at least three sub-images being acquired using a different one of the at least three types of light and at least partly excluding the at least two other types of light;
   a cover coupled to the lighting attachment and including a plurality of filters configured to overlay the plurality of light sources; and
   one or more processor devices that are configured to generate an image of the surface, including the surface features, based on the at least three sub-images, the image representing differences in surface slope of the surface features as differences in grey values in the image.

9. The imaging system of claim 8, wherein each of the at least three types of light has a different polarization orientation and wherein each the three types of light is linearly polarized.

10. The imaging system of claim 8, wherein the at least three types of light include at least four types of light;
    wherein the single image acquisition includes acquiring at least four sub-images, each of the at least four sub-images being acquired using a different one of the at least four types of light and at least partly excluding the at least three other types of light; and
    wherein the one or more processor devices are configured to generate the image of the surface based on the at least four sub-images.

11. The imaging system of claim 10, wherein each of the at least four types of light has a different polarization orientation.

12. The imaging system of claim 11, wherein the one or more light sources are configured to simultaneously illuminate the surface by illuminating the surface from first, second, third, and fourth sides with light of first second, third, and fourth polarization orientations, respectively.

13. The imaging system of claim 12, wherein the first side is opposite the third side, and the second side is opposite the fourth side;
 wherein a difference between the first and third polarization orientations is 90 degrees; and
 wherein a difference between the second and fourth polarization orientations is 90 degrees.

14. The imaging system of claim 8, further comprising:
 one or more pre-surface filters configured to provide at least three polarization orientations corresponding to the at least three types of light; and
 one or more post-surface filters configured to selectively pass each of the at least three polarization orientations for acquisition of the at least three sub-images, respectively.

15. The imaging system of claim 14, wherein the one or more imaging sensors include at least three imaging sensors, each configured to acquire a respective one of the at least three sub-images; and
 further comprising one or more beam splitters arranged to direct light from the surface onto each of the at least three imaging sensors.

16. The imaging system of claim 14, wherein the one or more imaging sensors includes a single imaging sensor that is configured to acquire each of the at least three sub-images.

17. An imaging system for analyzing surface features of an object, the imaging system comprising:
 a single imaging device comprising:
  a lens arrangement that defines an optical axis for image acquisition; and
  one or more imaging sensors aligned with the lens arrangement and the optical axis;
  a lighting system integrated into the single imaging device and having a first lighting array on a first side of the optical axis, a second lighting array on a second side of the optical axis, and a third lighting array on a third side of the optical axis;
 a cover coupled to the lighting system and including a first filter configured to overlay the first lighting array, a second filter configured to overlay the second lighting array, and a third filter configured to overlay the third lighting array; and
 one or more processor devices that are configured to analyze the surface features by:
 controlling the lighting system to simultaneously cause the first lighting array to illuminate the object with a first type of light, cause the second lighting array to illuminate the object with a second type of light, and cause the third lighting array to illuminate the object with a third type of light, each of the first, second, and third types of light being different from the others of the first, second, and third types of light;
 receiving first sub-image data, second sub-image data, and third sub-image data from the one or more imaging sensors, wherein the first, second, and third sub-image data are acquired by the one or more imaging sensors using a respective one of the first, second, and third types of light, and at least partly excluding one or more of the respective others of the first, second, or third types of light; and
 collectively analyzing the first, second and third sub-image data to analyze the surface features.

* * * * *